United States Patent [19]
Fujino

[11] Patent Number: 5,583,740
[45] Date of Patent: Dec. 10, 1996

[54] PACKAGE TYPE FUSED SOLID ELECTROLYTIC CAPACITOR

[75] Inventor: Shinichi Fujino, Chikugo City, Japan

[73] Assignee: Rohm Co., Ltd., Kyoto, Japan

[21] Appl. No.: 520,005

[22] Filed: Aug. 28, 1995

[30] Foreign Application Priority Data

Aug. 29, 1994 [JP] Japan .................................. 6-203361

[51] Int. Cl.⁶ ...................................................... H01G 9/00
[52] U.S. Cl. .................. 361/534; 361/274.1; 361/275.1; 361/275.4
[58] Field of Search ............................... 361/15–17, 273, 361/274.1, 275.2, 275.4, 534

[56] References Cited

U.S. PATENT DOCUMENTS

| | | |
|---|---|---|
| 4,169,271 | 9/1979 | Saitoh . |
| 4,763,228 | 8/1988 | Su . |
| 4,935,848 | 6/1990 | Yamane et al. ........................... 361/534 |
| 4,989,119 | 1/1991 | Gouvernelle ............................ 361/534 |
| 5,206,798 | 4/1993 | Sugisaki .................................. 361/534 |

*Primary Examiner*—Bot L. Ledynh
*Attorney, Agent, or Firm*—Michael D. Bednarek; Kilpatrick & Cody

[57] ABSTRACT

A solid electrolytic capacitor is provided which comprises a capacitor element and a safety fuse. The anode of the capacitor element is electrically connected to an anode lead, whereas the cathode of the capacitor element is electrically connected to a cathode lead through the safety fuse. A resin package encloses the capacitor element, the fuse, a part of the anode lead, and a part of the cathode lead. The resin package has a recess which is formed with a port extending toward the fuse. An elastic closure member is fitted in the recess of the resin package to close the port.

20 Claims, 3 Drawing Sheets

PACKAGE TYPE FUSED SOLID ELECTROLYTIC CAPACITOR

BACKGROUND OF THE INVENTION

1. Field of the Invention

This invention relates to a solid electrolytic capacitor such as tantalum capacitor or aluminum capacitor. More specifically, the present invention relates to a package type solid electrolytic capacitor which incorporates a safety fuse within the package.

2. Description of the Related Art

Solid electrolytic capacitors such as tantalum capacitors or aluminum capacitors are known to provide a large capacitance while realizing a great size reduction. For this reason, solid electrolytic capacitors are used in various applications.

Typically, a solid electrolytic capacitor has a capacitor element and a resin package enclosing the capacitor element for protection, as disclosed in Japanese Patent Application Laid-open No. 5-67523 (Laid-open: Mar. 19, 1993) for example. The capacitor element includes a capacitor chip, and an anode wire partially inserted into and partially projecting from the chip. The capacitor chip may be a compacted and sintered mass of tantalum powder which is treated to have a dieletric layer and a solid electrolyte layer. The electrolyte layer serves as a cathode of the capacitor element, whereas the anode wire acts as an anode.

The anode wire may be directly connected to an anode lead by welding for example, whereas the capacitor chip (solid electrolyte layer) may be electrically connected to a cathode lead through a safety fuse. The fuse may be designed to be melt-cut upon passage of an overcurrent and/or by an excessive temperature.

With the prior art fused capacitor described above, when the safety fuse is melt-cut, a melted portion of the fuse undergoes a considerable volmetric increase. Such a volmetric increase may be allowed to a certain extent by enclosing an intermediate portion of the fuse in an elastic insulating resin member. However, if the volumetric increase is too large, the molten metal may leak out of the resin package, consequently solidifying outside the resin package. As a result, the leaked portion of the fuse may cause shorting or other electrical troubles on a circuit board on which the capacitor is mounted.

Further, since the resin package is not light-permeable, it is impossible to visually recognize a breakdown of the safety fuse unless a melted portion of the fuse leaks out of the resin package.

SUMMARY OF THE INVENTION

It is, therefore, an object of the present invention to provide a package type fused solid electrolytic capacitor which overcomes the above-described problems.

According to the present invention, there is provided a solid electrolytic capacitor comprising:

a capacitor element having a first pole and a second pole;

a first lead electrically connected to the first pole of the capacitor element;

a second lead electrically connected to the second pole of the capacitor element through a safety fuse;

a resin package enclosing the capacitor element, the fuse, a part of the first lead, and a part of the second lead, the resin package having a recess which is formed with a port extending toward the fuse; and an elastic closure member fitted in the recess of the resin package to close the port.

Typically, the first pole is an anode of the capacitor element, whereas the second pole is a cathode of the capacitor element. In this case, the first lead is an anode lead for connection to the anode of the capacitor element, whereas the second lead is a cathode lead for electrical connection to the cathode of the capacitor element via the safety fuse.

Preferably, the closure member may be light-permeable to make a melted portion of the fuse visible from outside. Further, the closure member may be made of a material selected from a group consisting of silicone resin and rubber.

According to a preferred embodiment of the present invention, the fuse has an intermediate portion enclosed in an elastic insulating resin member. In this case, the port may extend only to the insulating resin member. Alternatively, the port may extend into the insulating resin member to a position of the fuse. Further, the insulating resin member may be made of silicone resin.

The fuse may be an overcurrent fuse which is melt-cut upon passage of an overcurrent. Alternatively, the fuse may be a temperature fuse which is melt-cut when the temperature elevates excessively beyond a predetermined value.

Other objects, features and advantages of the present invention will be fully understood from the following detailed description given with reference to the accompanying drawings.

DETAILED DESCRIPTION OF THE PREFERRED EMBODIMENTS

Figure 1:
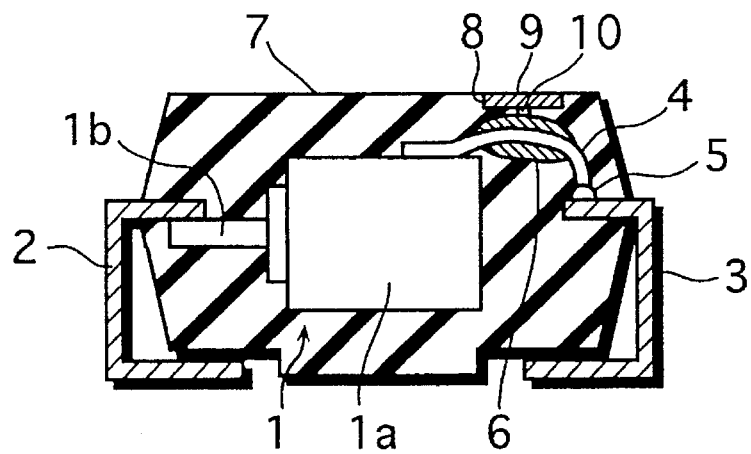
FIG. 1 is a front view, in vertical section, showing a package type fused solid electrolytic capacitor embodying the present invention.

Referring first to FIG. 1 of the accompanying drawings, there is illustrated a package type fused solid electrolytic capacitor according to a first embodiment of the present invention. The capacitor may be typically a tantalum capacitor or an aluminum capacitor for example.

The capacitor comprises a capacitor element 1 which includes a capacitor chip 1a and an anode wire 1b projecting from the chip 1a. The capacitor chip 1a may be a compacted and sintered mass of tantalum powder for example, in which case the anode wire 1b is also made of tantalum. The chip 1a is treated to have a dielectric layer (not specifically shown) and a solid electrolyte layer (not specifically shown).

The anode wire 1b of the capacitor element 1 is attached to an anode lead 2 by welding for example. The capacitor chip 1a is electrically connected to a cathode lead 3 through a safety fuse 4 which is designed to be melt-cut by passage of an overcurrent and/or by excessive temperature. The safety fuse 4 may be made of a low melting point metal such as aluminum alloy or solder for example. In the embodiment of FIG. 1, the fuse 4 has a nail head end 5 for attachment to the cathode lead 3, and is partially enclosed in an elastic insulating resin member 6 which may be preferably made of silicone resin.

The capacitor element 1 and the fuse 4 together with the respective inner ends of the anode and cathode leads 2, 3 are enclosed in a resin package 7 which is made of a thermosetting resin such as epoxy. The projecting portions of the anode and cathode leads 2, 3 are bent inwardly toward the underside of the package 7 for conveniently mounting to a surface of a circuit board (not shown).

According to the embodiment of FIG. 1, the resin package 7 is formed with a recess 8 at a position immediately above the elastic insulating resin member 6. The recess 8 has a port 10 extending to the resin member 6, and an elastic closure member 9 is provided in the recess 8 for closing the port 10. The closure member 9 may be made of silicone resin or rubber for example.

Figure 2:
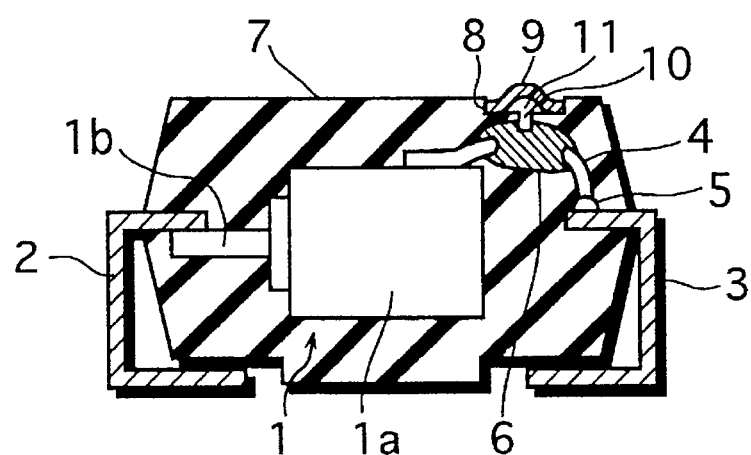
FIG. 2 is a view similar to FIG. 1 but showing the same capacitor after the fuse is melt-cut.

In operation, the solid electrolytic capacitor is mounted on a printed circuit board by soldering the anode and cathode leads 2, 3 to relevant conductor pads of the circuit board. When the safety fuse 4 is melt-cut by passage of an overcurrent and/or by an excessive temperature, the fused metal undergoes a volmetric increase. As a result, a portion of the fused metal flows through the port 10 into the recess 8 for causing the elastic closure member 9 to bulge outward, as shown in FIG. 2. The fused metal solidifies in this state.

As can be readily appreciated from FIG. 2, the elastic closure member 9 bulges outward due to its elastic nature but prevents the fused metal from leaking out of the resin package 7. Thus, the elastic closure member 9 can reliably prevent the fused metal from flowing onto the circuit board to cause shorting or other operating troubles. Further, the bulging of the elastic closure member 9 provides a visual recognition that the safety fuse 4 is melt-cut, thereby notifying the need for replacement.

The elastic closure member 9 may be preferably transparent or semi-transparent. In this case, the closure member 9 enables the user to see the solidified metal, thereby additionally facilitating a visual recognition of the fuse breakdown.

The package type fused solid electrolytic capacitor described above may be manufactured in the following manner.

Figure 3:
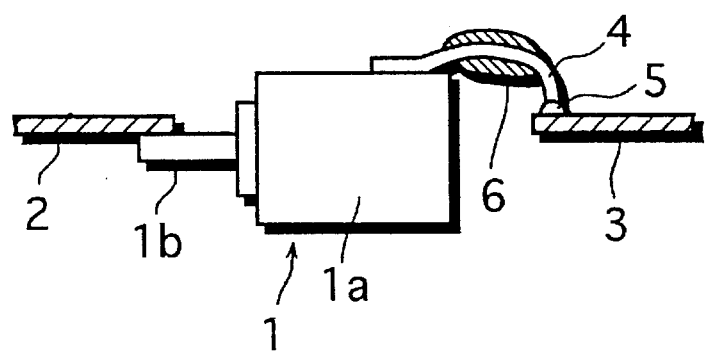
FIGS. 3 and 4 are views illustrating the successive steps of making the capacitor shown in FIG. 1.

First, as shown in FIG. 3, a capacitor element 1 is placed between an anode lead 2 and a cathode lead 3, and its anode wire 1b is attached to the underside of the anode lead 2 by welding.

It should be appreciated that the anode and cathode leads 2, 3 are part of a leadframe (not shown).

Then, as also shown in FIG. 3, one end of a safety fuse 4 is attached to the cathode lead 3 by ball bonding to form a nail head end 5, whereas the other end of the fuse 4 is attached to the capacitor chip 1a by stitch bonding for example.

Then, as also shown in FIG. 3, an elastic insulating resin member 6 is formed by applying silicone resin to enclose an intermediate portion of the safety fuse 4.

Figure 4:
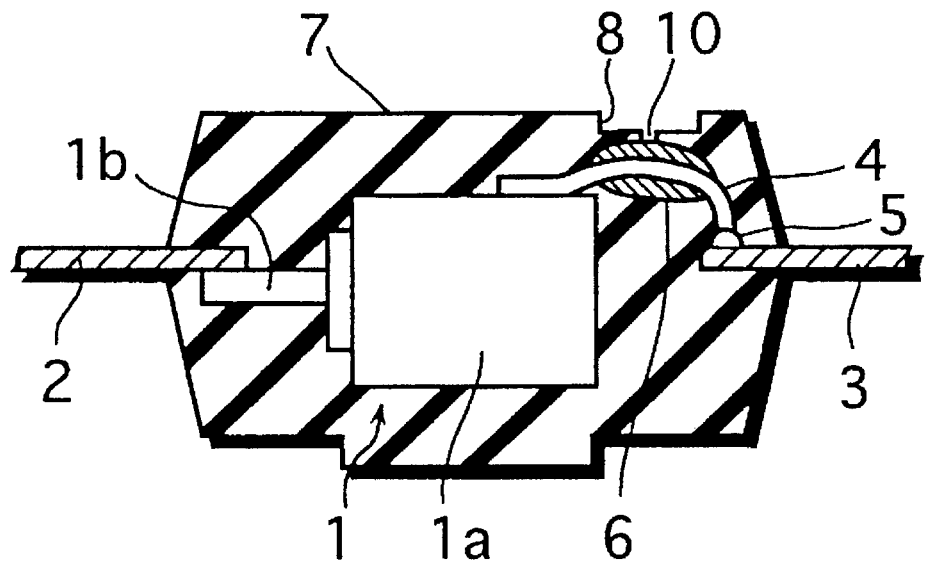

Then, as shown in FIG. 4, a resin package 7 is formed by transfer molding to enclose the capacitor element 1 and the fuse 4 together with the respective inner ends of the anode and cathode leads 2, 3. In this step, use is made of a mold which is configured to form a recess 8 and a port 10.

Then, as shown in FIG. 1, an elastic closure member 9 is formed by potting a suitable amount of silicone resin into the recess 8.

Finally, the anode and cathode leads 2, 3 are cut off from the unillustrated leadframe, and the projecting portions of the respective leads 2, 3 are downwardly inward onto the underside of the resin package 8.

Figure 5:
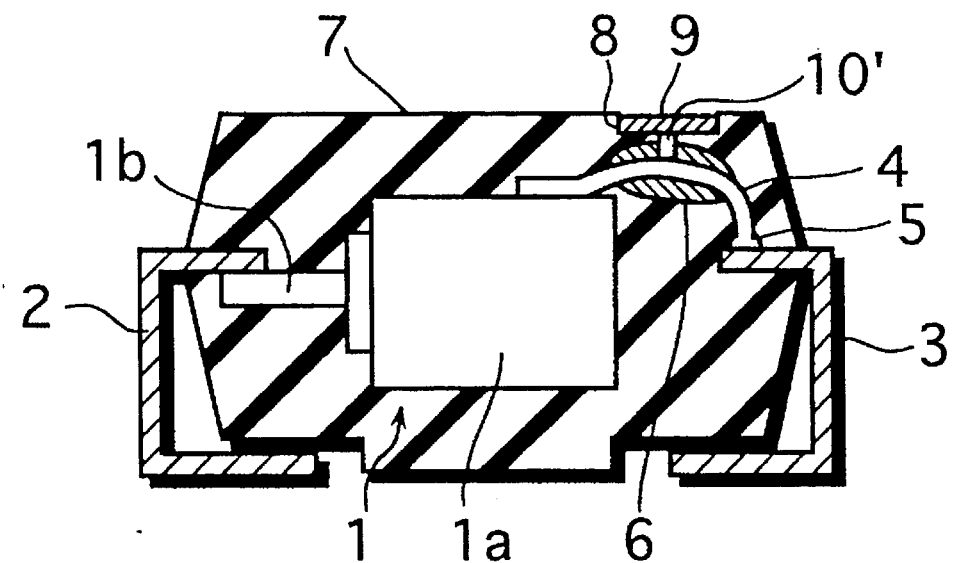
FIG. 5 is a front view, in vertical section, showing another package type fused solid electrolytic capacitor.

FIG. 5 shows a package type fused solid electrolytic capacitor according to a second embodiment of the present invention. The capacitor of this embodiment is similar to that of the first embodiment but differs therefrom only in that a port 10' extends into the elastic insulating resin member 6 up to the position of the safety fuse 4.

The capacitor of the second embodiment may be manufactured in substantially the same manner as described for the capacitor of the first embodiment, except for the process step of molding the resin package 7.

Specifically, as shown in FIG. 3, a capacitor element 1 is first placed between an anode lead 2 and a cathode lead 3, and its anode wire 1b is attached to the underside of the anode lead 2 by welding.

Then, as also shown in FIG. 3, one end of a safety fuse 4 is attached to the cathode lead 3 by ball bonding to form a nail head end 5, whereas the other end of the fuse 4 is attached to the capacitor chip 1a by stitch bonding for example.

Then, as also shown in FIG. 3, an elastic insulating resin member 6 is formed by applying silicone resin to enclose an intermediate portion of the safety fuse 4.

Figure 6:
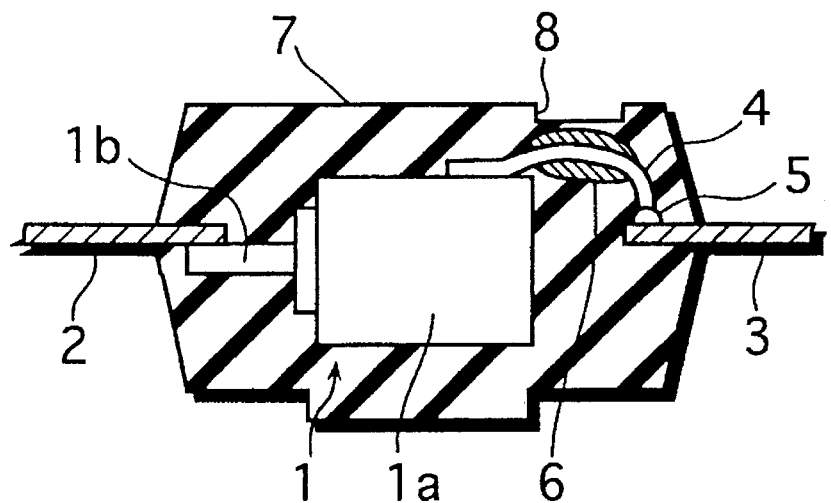
FIGS. 6 and 7 are sectional views illustrating the successive steps of making the capacitor shown in FIG. 5.

Then, as shown in FIG. 6, a resin package 7 is formed by transfer molding to enclose the capacitor element 1 and the fuse 4 together with the respective inner ends of the anode and cathode leads 2, 3. In this step, use is made of a mold which is configured to form a recess 8 but not a port, as opposed to the process step shown in FIG. 4.

Figure 7:
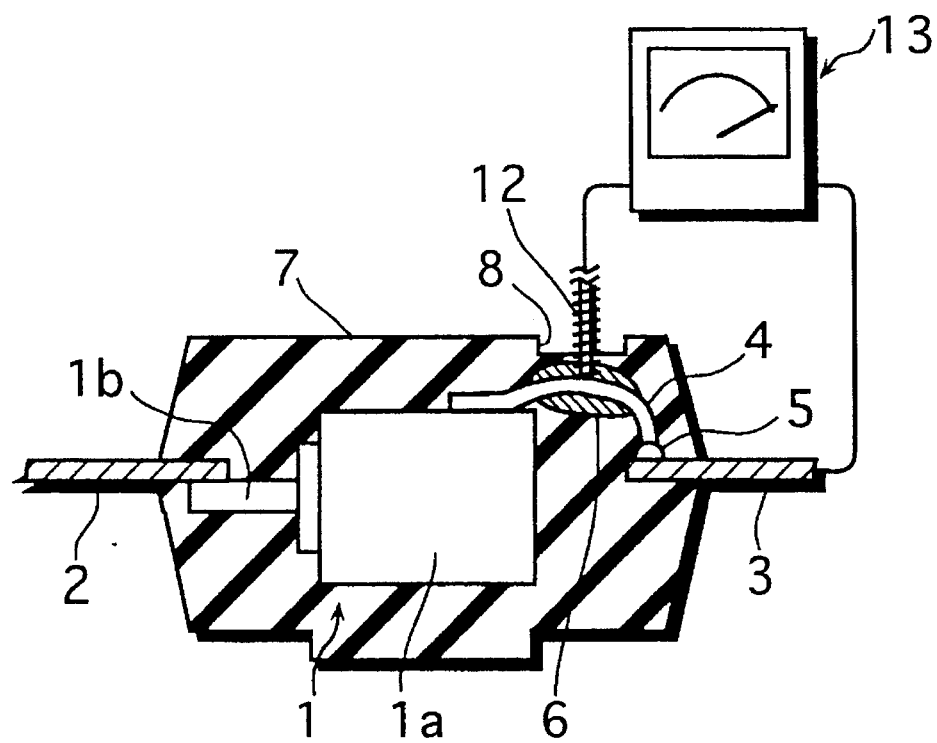

Then, as shown in FIG. 7, a port 10' is formed generally at the center of the recess 8 by a drill 12 which is connected to one pole of a conduction tester 13. In drilling, the other pole of the tester 3 is electrically connected to the cathode lead 3. The drilling step is finished when the forward end of the drill 12 comes into contact with the fuse 4 to activate the tester 13.

Then, as shown in FIG. 5, an elastic closure member 9 is formed by potting a suitable amount of silicone resin into the recess 8.

Finally, the anode and cathode leads 2, 3 are cut off from the unillustrated leadframe, and the projecting portions of the respective leads 2, 3 are downwardly inward onto the underside of the resin package 8.

The second embodiment described above requires the additional step of drilling the port 10' after molding the resin package 7. However, since the thus drilled port 10' extends into the elastic insulating resin member 6 up to the position of the fuse 4, a melted portion of the fuse 4 can readily flow through the port 10' into the recess 8 when the fuse is melt-cut upon passage of an overcurrent or by application of an excessive temperature.

The preferred embodiments of the present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A solid electrolytic capacitor comprising:

a capacitor element having a first pole and a second pole;

a first lead electrically connected to the first pole of the capacitor element;

a second lead electrically connected to the second pole of the capacitor element through a safety fuse;

a resin package enclosing the capacitor element, the fuse, a part of the first lead, and a part of the second lead, the resin package having a recess which is formed with a port extending toward the fuse; and an elastic closure member fitted in the recess of the resin package to close the port;

wherein the closure member is spaced from the fuse.

2. The capacitor according to claim 1, wherein the closure member is light-permeable.

3. The capacitor according to claim 1, wherein the closure member is made of a material selected from a group consisting of silicone resin and rubber.

4. The capacitor according to claim 1, wherein the fuse has an intermediate portion enclosed in an elastic insulating resin member.

5. The capacitor according to claim 4, wherein the port extends only to the insulating resin member.

6. The capacitor according to claim 4, wherein the port extends into the insulating resin member to a position of the fuse.

7. The capacitor according to claim 4, wherein the insulating resin member is made of silicone resin.

8. The capacitor according to claim 1, wherein the fuse is an overcurrent fuse.

9. The capacitor according to claim 1, wherein the fuse is a temperature fuse.

10. A solid electrolytic capacitor comprising:

a capacitor element having an anode and a cathode;

an anode lead electrically connected to the anode of the capacitor element;

a cathode lead electrically connected to the cathode of the capacitor element through a safety fuse;

a resin package enclosing the capacitor element, the fuse, a part of the anode lead, and a part of the cathode lead, the resin package having a recess which is formed with a port extending toward the fuse; and an elastic closure member fitted in the recess of the resin package to close the port;

wherein the closure member is spaced from the fuse.

11. The capacitor according to claim 10, wherein the closure member is light-permeable.

12. The capacitor according to claim 10, wherein the closure member is made of a material selected from a group consisting of silicone resin and rubber.

13. The capacitor according to claim 10, wherein the fuse has an intermediate portion enclosed in an elastic insulating resin member.

14. The capacitor according to claim 13, wherein the port extends only to the insulating resin member.

15. The capacitor according to claim 13, wherein the port extends into the insulating resin member to a position of the fuse.

16. The capacitor according to claim 13, wherein the insulating resin member is made of silicone resin.

17. The capacitor according to claim 10, wherein the fuse is an overcurrent fuse.

18. The capacitor according to claim 10, wherein the fuse is a temperature fuse.

19. A solid electrolytic capacitor comprising:

a capacitor element having a first pole and a second pole;

a first lead electrically connected to the first pole of the capacitor element;

a second lead electrically connected to the second pole of the capacitor element through a safety fuse;

a resin package enclosing the capacitor element, the fuse, a part of the first lead, and a part of the second lead, the resin package having a recess which is formed with a port extending toward the fuse; and an elastic closure member fitted in the recess of the resin package to close the port;

wherein the port provides an unoccupied passage extending to the closure member.

20. A solid electrolytic capacitor comprising:

a capacitor element having a first pole and a second pole;

a first lead electrically connected to the first pole of the capacitor element;

a second lead electrically connected to the second pole of the capacitor element through a safety fuse;

a resin package enclosing the capacitor element, the fuse, a part of the first lead, and a part of the second lead, the resin package having an outer recess which is formed with an inner port extending toward the fuse; and an elastic closure member fitted in the outer recess of the resin package to close the inner port;

wherein the outer recess is cross-sectionally larger than the inner port.

* * * * *